(12) United States Patent
Pollock

(10) Patent No.: US 6,468,429 B1  
(45) Date of Patent: Oct. 22, 2002

(54) APPARATUS AND METHOD FOR CONTROLLING LIQUOR CIRCULATION FLOW IN LONG VERTICAL SHAFT BIOREACTORS

(75) Inventor: David C. Pollock, Calgary (CA)

(73) Assignee: Noram Engineering and Constructors Ltd., Vancouver (CA)

(*) Notice: Subject to any disclaimer, the term of this patent is extended or adjusted under 35 U.S.C. 154(b) by 0 days.

(21) Appl. No.: 09/570,162

(22) Filed: May 11, 2000

(51) Int. Cl.⁷ .................................................. C02F 3/02
(52) U.S. Cl. ..................... 210/614; 210/629; 210/199; 210/220; 210/221.2; 210/620
(58) Field of Search ................................. 210/614, 620, 210/621, 626, 629, 150, 195.1, 199, 220, 221.2, 908

(56) References Cited

U.S. PATENT DOCUMENTS

| 4,259,182 A | * | 3/1981 | Belveal |
| 4,278,546 A | | 7/1981 | Roesler ..................... 210/626 |
| 4,287,070 A | * | 9/1981 | Pollock |
| 4,407,718 A | * | 10/1983 | Pollock |
| 4,425,231 A | * | 1/1984 | Fujimoto et al. |
| 5,645,726 A | | 7/1997 | Pollock ..................... 210/626 |
| 5,650,070 A | | 7/1997 | Pollock ..................... 210/612 |

* cited by examiner

Primary Examiner—David A. Simmons  
Assistant Examiner—Fred Prince  
(74) Attorney, Agent, or Firm—Oyen Wiggs Green & Mutala

(57) ABSTRACT

This application relates to improvements to long vertical shaft bioreactors for the aerobic biological treatment of wastewater and aerobic digestion of biodegradable sludges. The invention comprises a flow control device and method which improves hydraulic flow, inter-zonal mixing and gas transfer in such bioreactors. The flow control device includes a ported upper plate which is mounted in an upflow chamber of the bioreactor and a lower plate located below the upper plate at the juncture between mix and plug flow zones of the bioreactor which are in fluid communication. At least some of the ports in the upper plate are fitted with adjustable valves for regulating the flow of liquor therethrough and hence the size of a hydraulic head loss imposed by the flow control device. Preferably the upper plate is mounted at a location in the upflow chamber upstream from the inlet where influent is discharged into the bioreactor. The flow control device reduces the circulation velocity of the liquor in an upper circulating zone of the bioreactor and also provides a physical barrier substantially restricting inter-zonal mixing between the mix and plug flow zones.

29 Claims, 9 Drawing Sheets

APPARATUS AND METHOD FOR CONTROLLING LIQUOR CIRCULATION FLOW IN LONG VERTICAL SHAFT BIOREACTORS

TECHNICAL FIELD

An apparatus and method for controlling hydraulic flow, mixing and gas transfer characteristics in long vertical shaft bioreactors.

FIELD OF INVENTION

This invention relates to long vertical shaft bioreactors for the aerobic biological treatment of wastewater and aerobic digestion of biodegradable sludges. In particular, the invention relates to an apparatus and method to improve control of hydraulic flow, inter-zonal mixing and gas transfer characteristics in such bioreactors.

BACKGROUND

Long vertical shaft bioreactor systems are well known in the prior art. For example, U.S. Pat. Nos. 5,645,726 and 5,650,070, Pollock, which issued on Jul. 8, 1997 and Jul. 22, 1997 respectively, relate to bioreactors adapted for the treatment of biodegradable sludge and wastewater. These bioreactors comprise a circulatory system that includes at least two long substantially vertical side-by-side or coaxial chambers (i.e. a downflow and an upflow chamber) in communication with each other at their upper and lower ends. In particular, the upper ends of the chambers are connected through a surface basin and the lower ends communicate in a common mix zone located immediately below the lower end of the downflow chamber. A "plug flow" zone with no recycle is located immediately below, and communicates with, the mix zone. As used in this patent application "plug flow" refers to net downward migration of solid particles from the mix zone toward an effluent outlet located at the lower end of the reactor. The net downward migration may include some local back mixing.

The wastewater or sludge waste to be treated is caused to circulate repeatedly through and between the downflow and the upflow chambers, the surface basin and the mix zone. A portion of the circulating flow is directed to the plug flow zone and is removed at the lower end thereof as effluent.

Normally the waste-containing liquor comprising biomass is and microbes, referred to as "mixed liquor", is driven through the circulatory system by the injection of an oxygen-containing gas, usually air, into either or both of the mix zone and the plug flow zone. Typically, in a reactor for the treatment of wastewater, the air is injected 5–10 feet above the bottom of the reactor and, optionally, a portion of air is also injected immediately below the lower end of the downflow chamber. The deepest air injection point divides the plug flow zone into a quasi plug flow zone with localized back mixing above the deepest point of air injection, and a strict plug flow zone with no mixing below the deepest point of air injection. The influent wastewater is introduced into the upflow chamber a short distance above the lower end of the downflow chamber. At start-up, air is injected at depth through the influent line into the upflow chamber thus causing liquor circulation between and through the upflow and downflow chambers in the nature of an air lift pump. Once circulation has started, all the air injection is diverted to the mix zone and/or plug flow zone. Bubbles rising out of these zones are entrained in the upflow chamber and excluded from the downflow chamber (because the downward flow of liquor in the downflow chamber exceeds the rise rate of the bubbles). Thus all the air bubbles are transferred to the upflow chamber and stable circulation is maintained.

Usually the surface basin is fitted with a horizontal baffle at the top of the upflow chamber to force the mixed liquor to traverse a major part of the basin and release spent gas before again entering the downflow chamber for further treatment. A zone of turbulence is created at the lower end of the downflow chamber by the turn-around velocity head as the circulating flow reverses from downward to upward flow. This mix zone is not well defined but typically is between 15–25 feet deep. A portion of the mixed liquor in the mix zone flows downwardly into the top of the plug flow zone in response to an equal amount of treated effluent being removed from the lower end of the plug flow zone into an effluent line as discussed above.

Reaction between waste, dissolved oxygen, nutrients and biomass (including an active microbial population), substantially takes place in an upper circulating zone of the bioreactor defined by the surface basin, the upflow and downflow chambers and the mix zone. The majority of the contents of the mix zone circulate upwardly into the upflow chamber. In this upflow chamber undissolved gas, mostly nitrogen, expands to help provide the gas lift necessary to drive circulation of the liquor in the upper part of the reactor. The spent gas is released from the liquor as it traverses the horizontal baffle in the surface basin. The plug flow zone located below the upper circulating zone provides a final treatment or "polish" to the mixed liquor flowing downward from the mix zone to effluent extraction at the lower end of the reactor. The injected oxygen-containing gas dissolves readily under pressure in the liquor in the plug flow zone where there is localized back mixing resulting in a slow net downward movement of liquor. Undissolved gas (bubbles) migrate upward to the very turbulent mix zone under pressure. The gas to liquid transfer in this zone is very high reaching overall reactor oxygen transfer efficiencies in excess of 65%. The products of the reaction are carbon dioxide and additional biomass which, in combination with unreacted solid material present in the influent wastewater, forms a sludge (or biosolids).

Long vertical shaft bioreactors designed for aerobic treatment of wastewater and sludge are generally similar. However, wastewater treatment bioreactors typically require a much smaller plug flow zone. Additionally, sludge treatment bioreactors preferably include two different aeration distributors for injecting air into the reaction vessel at two separate locations, namely in both the mix zone and the plug flow zone as described above.

The principal products of aerobic digestion of sludge biosolids in the mesophilic temperature range (up to approximately 40° C.) are carbon dioxide, nitrate nitrogen, and reduced sludge mass. The principal products of aerobic digestion in the thermophillic temperature range (approximately 45° C.–70° C.) are carbon dioxide and ammonia.

While existing long vertical shaft bioreactors, such as those described in U.S. Pat. Nos. 5,645,726 and 5,650,070, are useful in the treatment of wastewater and sludge biosolids, they exhibit several shortcomings which limit their commercial effectiveness. When such prior art bioreactors are designed to accommodate a wide range of loads and flows, the mix and plug flow zones may become over sized resulting in a loss in hydraulic and oxygen transfer efficiency under some operating conditions. As a compromise, prior art bioreactors are typically optimized for one condition - usually average load and flow. Unfortunately average conditions only occur briefly two or three times a day in a typical municipal waste treatment plant operating under diurnal loading conditions.

Under increasing loads and flows, where the air rate must be increased to satisfy the greater biological air requirement, the efficiency of the reactor is compromised. This is due to the increase in the circulation rate resulting from the increase in air rate. Increasing the circulation rate actually lowers the dissolved gas concentration, lowers the respiration rate of the microbes and increases hydraulic head losses, as explained in further detail below.

Hydraulic Considerations

When the circulation velocity in the upper circulating zone of the bioreactor increases, the mixing time at maximum pressure for the air and water decreases. Furthermore, for any given air rate, increasing the liquor velocity and therefore the liquor volume flowing past the point of air injection, dilutes the concentration of available air per unit volume of liquor. This reduces the saturation potential of air in water. Normally the downflow chamber is approximately one quarter the cross-sectional area of the reactor body so that an increase in liquor flow velocity in the upflow chamber, caused by the increased air rate, has nearly four times the impact on velocity of the liquor in the downflow chamber. The increased air rate will continue to increase the circulation velocity until hydraulic head equilibrium is established (i.e. when the hydraulic resistance associated with the downflow chamber balances the gas lift effect in the upflow chamber created by the additional air). In large reactors where the hydraulic loss in big pipes is relatively small, the liquor velocities in the downflow chamber can be 10–15 ft/sec. Experiments have shown the flow of liquor through the downflow chamber penetrates the plug flow zone about 1–1.5 ft. for each ft/second of downward velocity. Very high air rates that create downward flow rates of 10–15 ft./second can effectively eliminate the function of the plug flow zone, in wastewater treatment bioreactors, by mixing most of the plug flow volume into the recirculating flow. These same phenomena would also reduce the plug flow zone in bioreactors adapted for treatment of sludge biosolids by about 15–20%.

Accordingly, high downflow chamber flow rates are to be avoided because hydraulic losses in the downflow chamber portion of the bioreactor add directly to the head loss in the effluent line (the effluent line can be thought of hydraulically as a continuation of the downflow chamber, mix zone and plug flow zone). Overcoming such head loss requires pressurizing the effluent flow and/or pumping the influent flow into the reactor, resulting in operational inefficiencies.

Inter-zonal Mixing Considerations

Tracer studies on the plug flow zone of a bioreactor adapted for treatment of sludge biosolids (such as the VERTADTM™ bioreactor described in U.S. Pat. No. 5,650,070) show that, although the 10–15 ft./second circulating hydraulic flow penetration into the plug flow zone is substantially arrested 15–25 feet below the lower end of the downflow chamber, there remains a minor movement or flow below the zone of penetration. This flow moves very slowly and behaves as a locally backmixed "front". The "front" moves downward at about 1–3 feet per minute in clean water and about 0.5–1.5 feet per minute in 4% sludge. This liquid flow downward is approximately equivalent to the compressed volume flow of air bubbles moving up through the plug flow section of the reactor. High air rates resulting in higher mixing rates allow this "front" to proceed through the plug flow zone even more quickly thus reducing the effectiveness and value of the plug flow zone.

Biological considerations.

It is well known that the rate of biological oxygen demand (BOD) removal in bio-oxidation is a function of the BOD concentration up to a maximum rate. For any acclimatized biomass (biological mass of microbes) there is a concentration of BOD beyond which there will be no increase in removal rate. When the liquor circulation rate increases, the BOD concentration at the point of influent injection is diluted and the respiration rate drops from the desirable maximum value to a much lower value, thus reducing the reactor's biological capacity to bio-oxidize the organics in the wastewater or sludge.

Maintaining a higher respiration rate in the main circulating zone of the bioreactor results in removal of most of the BOD in the circulating zone. This allows the plug flow zone to operate at a lower respiration rate which in turn has the effect of preserving more of the dissolved air for use in flotation separation (i.e. separation of the biomass in the surface separation basin of the bioreactor). Accordingly, a reduction in the respiration rate in the circulating zone due to an increase in the air injection rate may reduce the dissolved air available for subsequent flotation separation.

In summary, increasing the air rate to accommodate increases in load or flow on an already optimized long vertical shaft bioreactor will have the following negative effects:
1. Lower dissolved oxygen levels.
2. Reduced respiration rate.
3. Increased hydraulic losses in the effluent line.
4. Partial mixing of the plug flow zone.
5. Reduced dissolved air for subsequent flotation separation.

The present invention not only offsets these negative impacts but can be adjusted on-line to improve the performance of the bioreactor for any load and flow.

SUMMARY OF THE INVENTION

In accordance with the invention, an aerobic bioreactor having elongate upflow and downflow chambers which are in fluid communication at their upper and lower ends is provided. The bioreactor further includes an influent conduit for discharging biodegradable waste into the upflow chamber; an effluent conduit for extracting effluent from a lower portion of the bioreactor; and a gas inlet for injecting oxygen-containing gas into the bioreactor to drive the circulation of a liquor comprising the biodegradable waste between the upflow and downflow chambers. The invention is characterized in that the bioreactor further includes a flow control device mounted in the upflow chamber upstream from a discharge end of the influent conduit, wherein the flow control device adjustably regulates the circulation velocity of the liquor.

Preferably the circulating liquor changes flow direction from downward flow to upward flow in a turbulent mix zone of the bioreactor located proximate the lower end of the downflow chamber and the flow control device further includes:
(a) an upper plate mounted in the upflow chamber near the upper end of the mix zone, the upper plate having a plurality of apertures therein permitting passage of the circulating liquor therethrough; and
(b) a lower plate mounted in the bioreactor beneath the upper plate near the lower end of the mix zone, the lower plate providing a partial barrier to flow of the liquor between the mix zone and a plug flow zone located below the mix zone.

The flow control device may also include a plurality of spaced-apart flow diverting plates extending vertically between the upper and lower plates and an impingement plate in the mix zone above the lower plate for diverting downwardly flowing liquor toward the lower plate.

In use, the flow control device imposes a hydraulic head loss near the lower end of the upflow chamber, whereby the circulating liquor on the lower side of the upper plate in communication with the effluent conduit is maintained at a higher pressure than the circulating liquor on the upper side of the upper plate in communication with the influent conduit, thereby causing the biodegradable waste to flow into the bioreactor through the influent conduit, and the effluent to flow out of said bioreactor through the effluent conduit, without the use of pumps.

The invention also encompasses a method of improving the efficiency of long vertical shaft aerobic bioreactors having elongate upflow and downflow chambers which are in fluid communication at their upper and lower ends; an influent conduit for discharging biodegradable waste into the upflow chamber; an effluent conduit for extracting effluent from a lower portion of the bioreactor; and a gas inlet for injecting oxygen-containing gas into the bioreactor to drive the circulation of a liquor comprising the biodegradable waste between the upflow and downflow chambers. The method includes the steps of:

(a) adjusting the volume of said oxygen-containing gas injected into the bioreactor in response to changes in the volume and/or concentration of biodegradable waste discharged into the bioreactor, thereby optimizing the rate of aerobic digestion of the waste; and (b) reducing the circulation velocity of the liquor to increase the residence time of the liquor in the upflow chamber.

BRIEF DESCRIPTION OF DRAWINGS

In drawings which describe embodiments of the invention but which should not be construed as restricting the spirit or scope of the invention in any way.

FIG. 2a is a diagrammatic vertical sectional view of a prior art VERTREAT™ bioreactor system fitted with a flow control device in accordance with the invention.

FIG. 2b is an enlarged sectional view of the flow control device of FIG. 2a.

FIG. 5 is an isometric, partially fragmented view of the bioreactor of FIG. 2a.

FIG. 6a is an enlarged vertical sectional view of the bioreactor system of FIG. 2a fitted with two flow control devices.

FIG. 6b is an enlarged sectional view of the flow control devices of FIG. 6a.

DETAILED DESCRIPTION OF THE PREFERRED EMBODIMENT

This application relates to improvements to long vertical shaft bioreactors such as those described in U.S. Pat. Nos. 5,645,726 an 5,650,070, Pollock, the disclosures of which are hereby incorporated by reference.

The '726 Patent describes a prior art VERTREAT™ system for treatment of wastewater which uses air injection to drive the circulation of a mixed liquor consisting of waste, nutrients and biomass within a bioreactor 10. The term "wastewater" as used herein is understood to include water carrying any type of biodegradable domestic or industrial waste materials, for example, normal domestic waste and the effluents produced by farms, food factories, refineries, pulp mills, breweries and other industries. By "mixed liquor" it is meant a mixture of liquids, solids and gas containing oxygen. The solids contain a diverse population of active microbes present in the bioreactor system.

Figure 1:
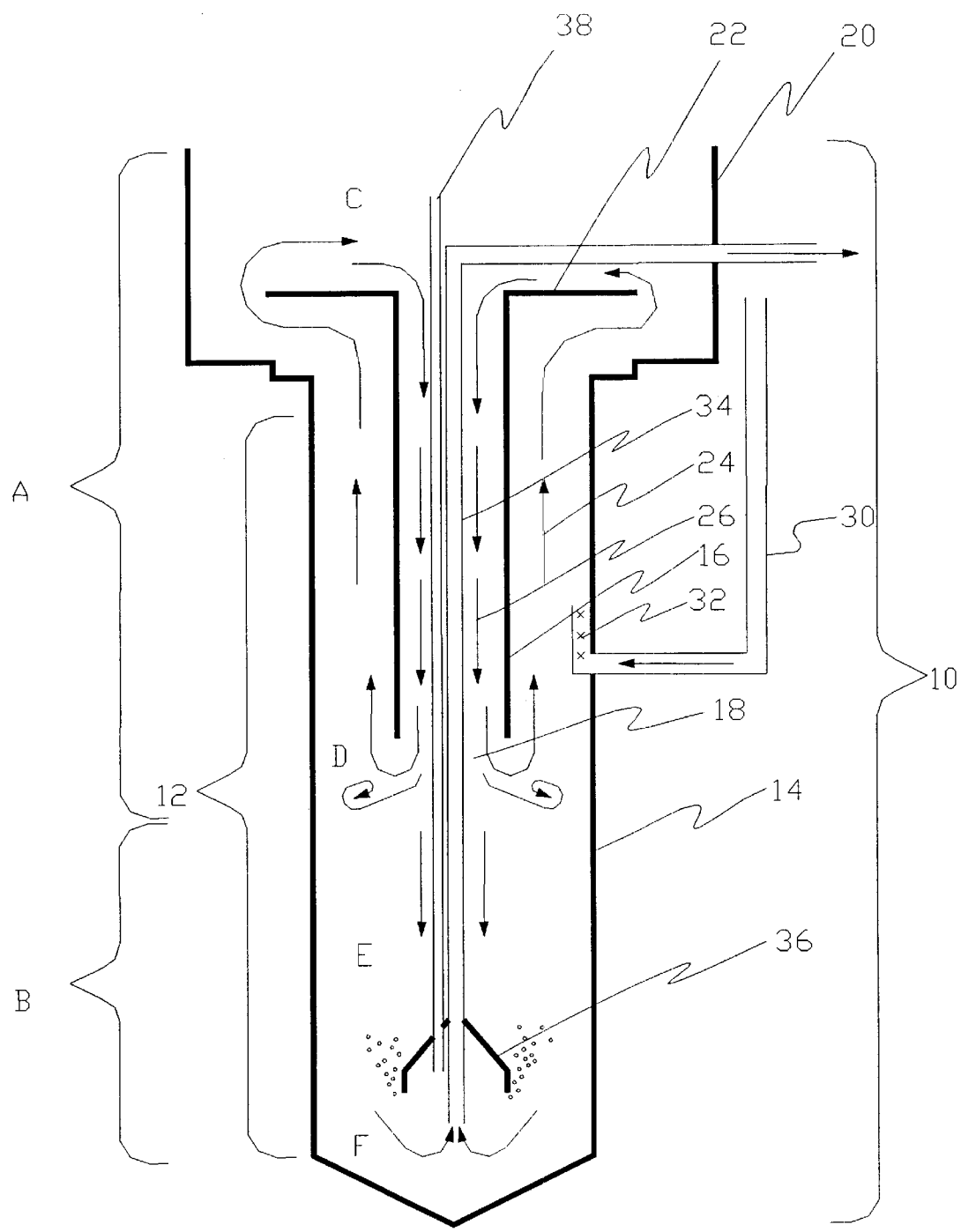
FIG. 1 is a diagrammatic vertical sectional view of a prior art VERTREAT™ bioreactor system.

As shown in FIG. 1, the VERTREAT™ bioreactor 10 comprises an elongated reactor vessel 12 having an outer wall 14. A liquor recycle conduit 16 having an open lower end extends longitudinally within a central portion of bioreactor 10. A surface basin 20 having a horizontal baffle 22 is located at an upper end of recycle conduit 16. Bioreactor wall 14 and conduit 16 together define at least two long substantially vertical side-by-side or coaxial chambers within reactor 10, namely an upflow chamber 24 between the outer surface of conduit 16 and wall 14 and a downflow chamber 26 within the interior of conduit 16. Chambers 24, 26 are in communication with each other at their upper ends through surface basin 20 and at their lower ends through a common mix zone located at the lower end 18 of downflow chamber 26.

Bioreactor 10 also includes an influent line 30 for introducing influent, such as wastewater or sludge, into upflow chamber 24. Preferably influent line 30 has an upturned discharge outlet 32 located at a position a short distance above lower end 18 of downflow chamber 26 (FIG. 1). Discharge outlet 32 is upturned to prevent the passage of air bubbles rising in upflow chamber 24 from entering influent line 30.

An effluent line 34 for extracting treated effluent from a lower portion of the reactor vessel 12 extends vertically within bioreactor 10. In the illustrated embodiment, effluent line 34 extends in a central portion of vessel 12 through recycle conduit 16. At least one aeration distributor 36 is preferably mounted on effluent line 34 for injecting air or any other suitable oxygen-containing gas into reactor 10. Air supply line(s) 38 are provided for delivering air to aeration distributor 36.

The circulation of liquor within bioreactor 10 is driven solely by the injection of air under pressure (i.e. in the nature of an air lift pump). At start-up, air is injected at depth through influent line 30 into upflow chamber 24 to initiate liquor circulation between chambers 24, 26 which are in fluid communication. In particular, liquor rises in upflow chamber 24 until it encounters baffle 22 causing the release of spent gas. The liquor then traverses surface basin 20 as shown by the direction of the arrows in FIG. 1 and flows downwardly through downflow chamber 26. At the lower end 18 of downflow chamber 26 the flow direction reverses as the liquor recirculates back into upflow chamber 24. A turbulent mix zone is created immediately beneath downflow chamber 26 by this reversal in liquor flow direction as discussed further below.

Once liquor circulation has been established, air is injected solely through aeration distributor 36. Bubbles from aeration distributor 36 are entrained in upflow chamber 24 and substantially excluded from downflow chamber 26 since the downward flow in chamber 26 exceeds the rise rate of the bubbles. Thus, substantially all the air bubbles are transferred to upflow chamber 24 and stable circulation is maintained.

As shown best in FIG. 1, reactor 10 is functionally divided into two separate zones, namely an upper circulating zone A and a lower plug flow zone B. Circulating zone A comprises a head tank zone C and a mixing zone D located near the lower end 18 of downflow chamber 26. The size of mix zone D is dependent upon a variety of factors, as discussed further below. The continuous extraction of effluent from the bottom portion of reactor vessel 12 into effluent line 34 causes a portion of the circulating liquor to be drawn into plug flow zone B which is located immediately below mix zone D. As used in this patent application "plug flow" refers to a net downward migration of solid particles from mix zone D to the inlet of effluent line 34. As described further below, plug flow zone B comprises a locally back mixed or quasi plug flow zone E and a strict plug flow or soak zone F. Soak zone F is located below the point of the deepest air injection.

Treatment of the circulating liquor (i.e. reaction between waste, dissolved oxygen, nutrients and biomass comprising an active microbial population) takes place principally in circulating zone A. Plug flow zone B provides a final treatment or "polish" to the mixed liquor. In the plug flow zone B the mixed liquor is not recycled through a conduit. Rather, the gas, present in dissolved or colloidal form, and the liquor flows downward at a relatively slow velocity toward the bottom of reactor vessel 12 where effluent is extracted into effluent line 34.

Figure 3:
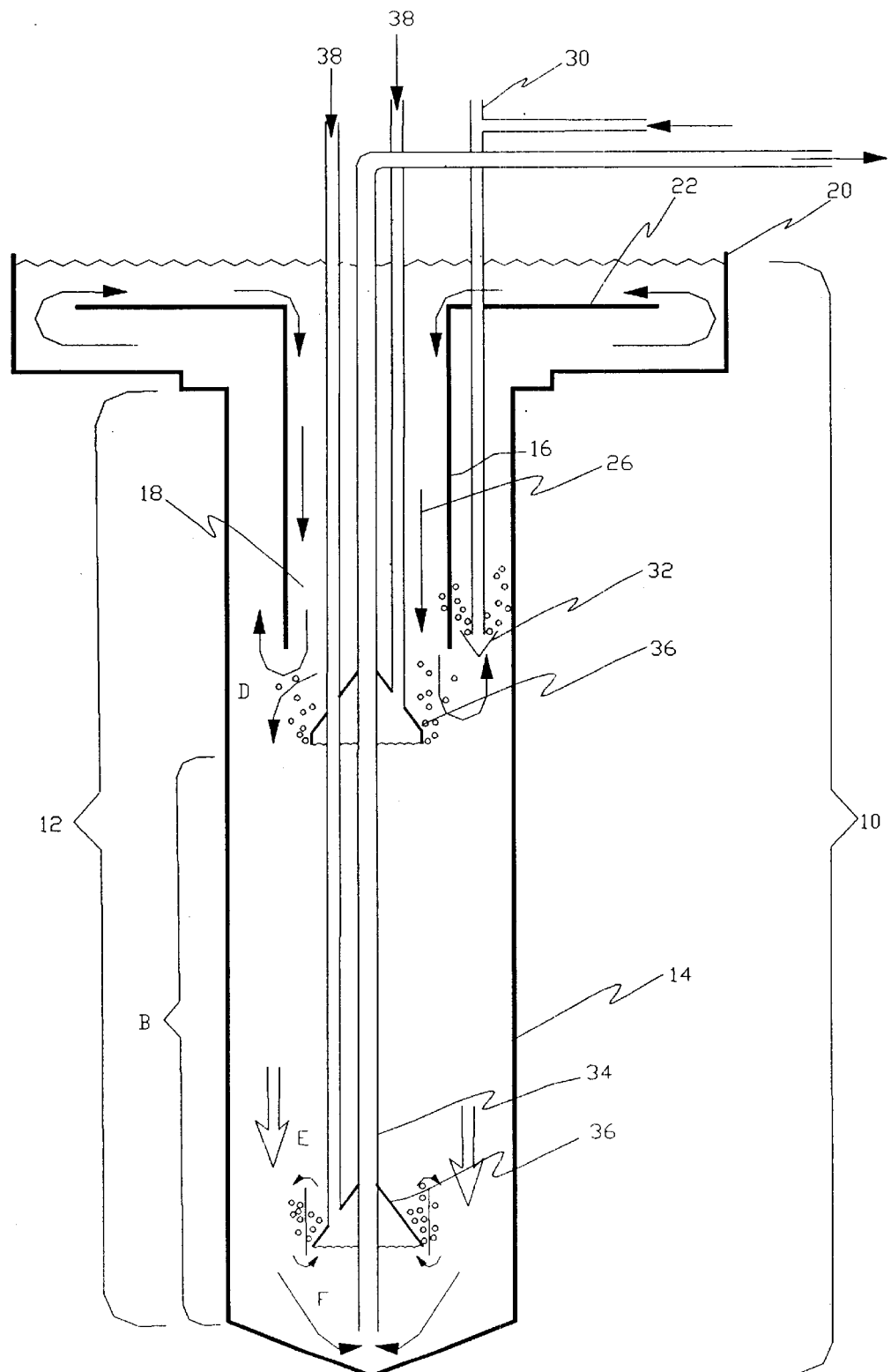
FIG. 3 is a diagrammatic vertical sectional view of a prior art VERTAD™ bioreactor system.
Figure 4:
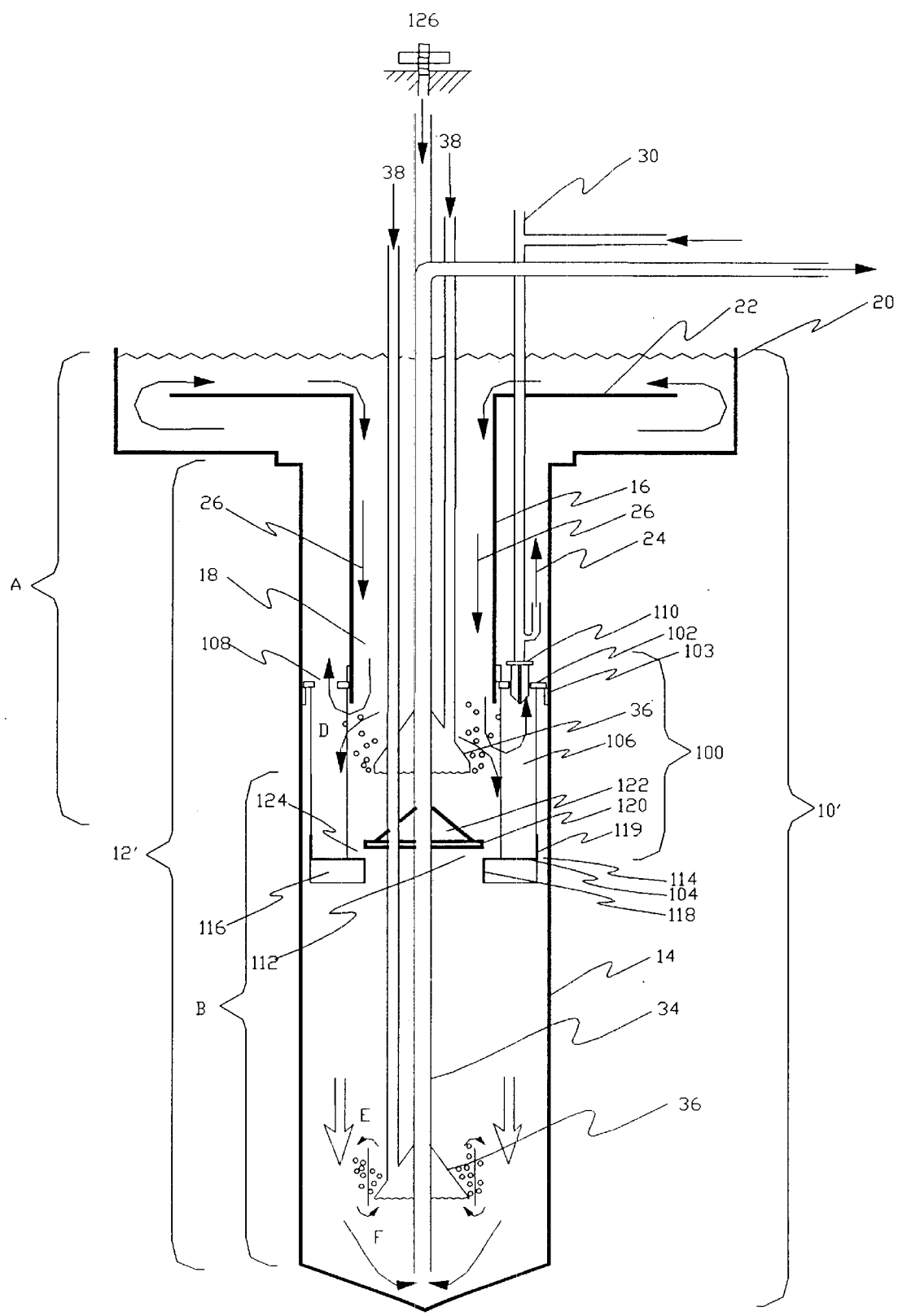
FIG. 4 is a diagrammatic vertical sectional view of a prior art VERTAD™ bioreactor system fitted with a flow control device in accordance with the invention.

The prior art VERTAD™ system described in the '070 Patent is illustrated in FIG. 3. The VERTAD™ bioreactor 10 is generally similar to the VERTREAT™ bioreactor 10 of FIG. 1 except that it is adapted for aerobic digestion of sludge rather than wastewater. The term sludge used herein is understood to mean a slurry of biodegradable solids typically less than 7% total dry solids by weight. The treated sludge is termed biosolids and may be dewatered to 25–55% dry weight by mechanical means and 90–95% dry weight by thermal means. The sludge may be produced, for example, as a byproduct of wastewater treatment in the VERTREAT™ system. The VERTAD™ bioreactor 10 of FIG. 3 preferably comprises two aeration distributors 36 for injecting air into vessel 12 at two separate locations, namely a first distributor 36 located in mix zone D (i.e. near the lower end 18 of downflow chamber 26) and a second distributor 36 located in plug flow zone B. Further, the VERTAD™ bioreactor 10 of FIG. 3 requires a much larger plug flow zone B than the VERTREAT™ system of FIG. 1.

The present invention relates to a flow control device generally designated 100 for regulating the flow of liquor and biosolids through one of the prior art VERTREAT™ or VERTAD™ bioreactors 10 described above. In the drawings of this application a bioreactor fitted with flow control device 100 is labelled bioreactor $10^1$ and the reactor vessel component of such a bioreactor $10^1$ is labelled $12^1$.

Figure 5:
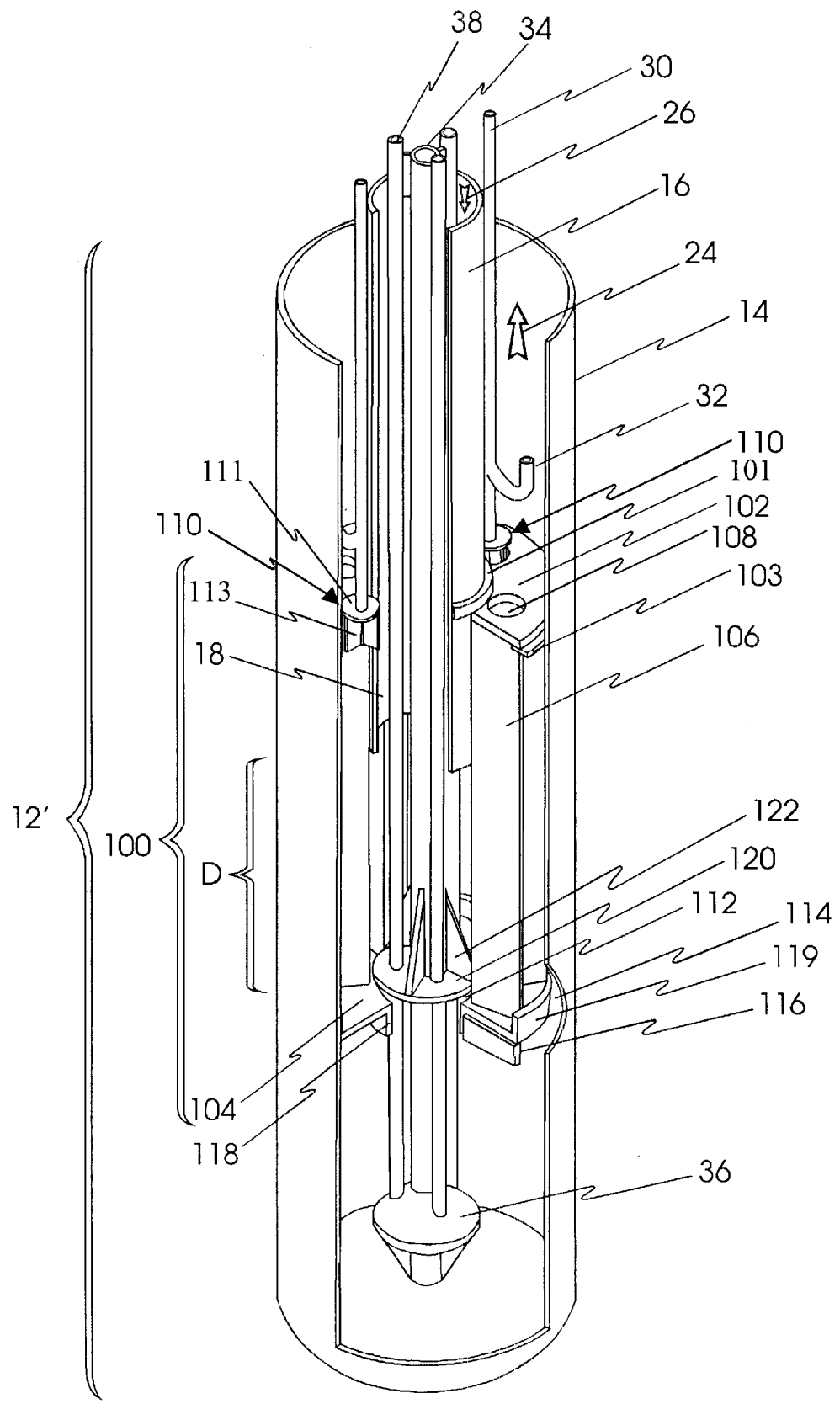

As best shown in FIG. 5, control device 100 includes an upper plate 102 which is fitted into the annulus of upflow chamber 24, preferably at a location a short distance above the lower end 18 of downflow chamber 26. Upper plate 102 is rigidly mounted between an inner support ring 101, fixed to the outer surface of recycle conduit 16, and an outer support ring 103 fixed to reactor wall 14. During operation of bioreactor $10^1$ a large hydraulic pressure differential arises across plate 102 and it is imperative that it is held securely in place.

Upper plate 102 comprises a plurality of spaced-apart ports 108 to enable passage of liquor therethrough. A plurality of vertically adjustable trim valves 110 are also provided which are moveable into selected ports 108 for regulating fluid flow therethrough. Each trim valve 110 comprises an upper plate 111 mounted on a centering flange 113 which is X-shaped in cross-section. Flange 113 centers trim valve 110 in the corresponding port 108 as best shown in FIG. 5. The position of each trim valve 110 is vertically adjustable to regulate the flow of liquor through ports 108. In the illustrated embodiment, trim valves 110 are connected to a bottom portion of an influent line 30. The position of trim valves 110, and hence the size of opening provided by the corresponding port 108, may therefore be controlled from the surface by raising or lowering the respective influent line 30.

As shown best in FIG. 5, control device 100 also includes an annular lower plate 104 which is connected to upper plate 102 by means of a plurality of spaced-apart flow diverting plates 106. Lower plate 104 extends horizontally at approximately the lower end of mix zone D. A vertically disposed inner skirt 118 extends downwardly from an inner edge of lower plate 104 and a vertically disposed outer skirt 119 extends upwardly from an outer edge of lower plate 104. A central circular orifice 112 is defined between inner skirt 118 and effluent line 34 and air lines 38 (which both extend in a central portion of reactor vessel $12^1$). As shown best in FIGS. 2 and 5, outer skirt 119 is spaced a short distance from reactor wall 14 to define a peripheral orifice 114. A plurality of spaced-apart radial baffles 116 also extend downwardly from lower plate 104 slightly lower than the depth of inner skirt 118. Baffles 116 intersect inner skirt 118 at right angles.

Figures 6A, 6B:
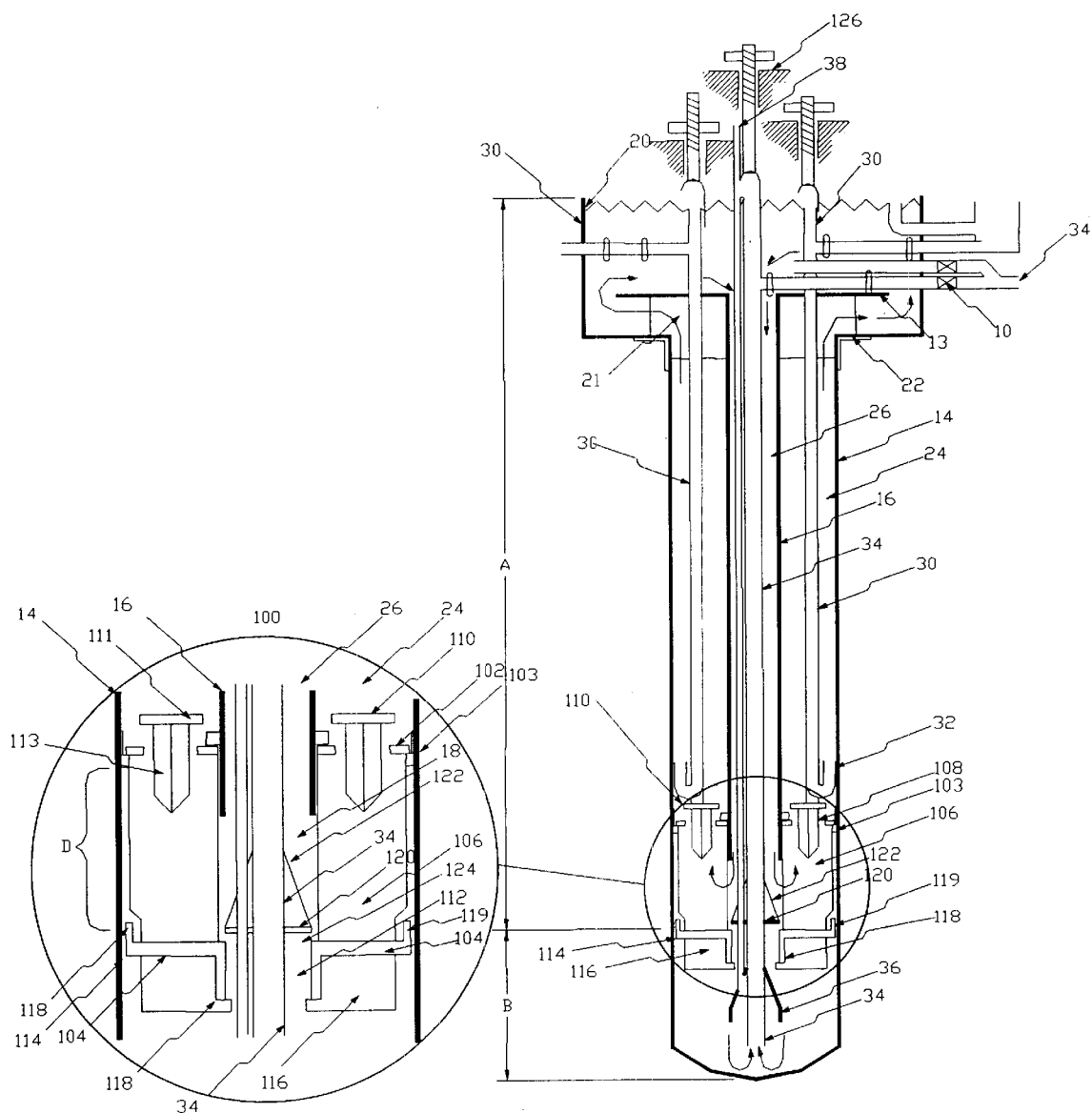

As shown in FIG. 5, control device 100 also includes an annular impingement plate 120 which is mounted on effluent line 34 a short distance above lower plate 104 (i.e. directly above lower plate central orifice 112). A plurality of spaced-apart vertical supports 122 are provided for coupling impingement plate 120 to effluent line 34. Impingement plate 120 is slightly larger in diameter than orifice 112 but smaller than the internal diameter of liquor recycle conduit 16. As shown best in FIG. 9, a fluid channel 124 is defined between impingement plate 120 and the underlying lower plate 104. Preferably the size of channel 124, which is in fluid communication with central orifice 112, is adjustable from the surface by means of a control 126 connected to the top of effluent line 34 (FIG. 6).

In use, control device 100 regulates the circulation of liquor through bioreactor $10^1$ to improve the efficiency of aerobic digestion therein. The circulation of liquor within bioreactor $10^1$ is driven by the injection of air, or some other suitable oxygen-containing gas, under pressure as described above. The wastewater or sludge to be treated is drawn into upflow chamber 24 of vessel 12[1] through influent line 30. Since effective circulation is maintained by injection of air into the system, influent and effluent flows into and out of bioreactor 10[1] without the use of pumps.

Preferably the influent is discharged into the circulating liquor in chamber 24 a short distance above control device 100. In upflow chamber 24 undissolved gas, mostly nitrogen, expands to provide the air lift necessary to drive fluid circulation in the upper portion of reactor vessel 12[1.] The spent gas is released from the liquor as it traverses baffle 22 of surface basin 20. The mixed liquor is then drawn from surface basin 20 into recycle conduit 16 and flows downwardly through downflow chamber 26. At the lower end 18 of downflow chamber 26 the direction of liquor flow reverses from downward to upward flow, resulting in the turbulent mix zone D. The depth of mix zone D depends upon the flow parameters but is typically on the order of 15–25 feet in depth. A portion of the mixed liquor in mix zone D continues to flow downwardly into plug flow zone B in response to an equal amount of treated effluent being withdrawn into effluent line 34.

The primary function of control device 100 is to slow the velocity of the mixed liquor flow in the upper circulating zone A. This is achieved by installing upper and lower plates 102, 104 at approximately the upper and lower ends of mix zone D respectively. Impingement plate 120 is mounted on effluent line 34 a short distance above lower plate 104. Liquor flowing downwardly through downflow chamber 26 is diverted outwardly toward the outer skirt 119 of lower plate 104. Air bubbles rising from aeration distributor 36 pass through orifices 112 and 114 (FIG. 9) causing the liquor to flow upwardly past diverting plates 106 into upflow chamber 24. The velocity of the rising liquor in upflow chamber 24 is restricted by the size of ports 108 in upper plate 102. In one embodiment of the invention the size of at least some of the ports 108 is adjustable by raising or lowering trim valves 110.

Control device 100 achieves several important advantages. In order for bioreactor 10[1] to digest waste at an optimum rate a sufficient amount of dissolved oxygen is required. Accordingly, when the waste load of bioreactor 10[1] is increased, it is desirable to also increase the rate of air injection through aeration distributor(s) 36. However, as explained above, increasing the aeration rate also increases the velocity of the circulating liquor which has several negative effects, namely lower dissolved oxygen levels, reduced respiration rate, increased hydraulic losses in the effluent line, partial mixing of the plug flow zone and reduced dissolved air available for flotation separation. By slowing the velocity of the circulating liquor, control device 100 offsets these negative effects and thereby enhances the efficiency of bioreactor 10[1.] These principal functions of control device 100 are described further below.

Increase in Dissolved Oxygen Content

Figure 7:
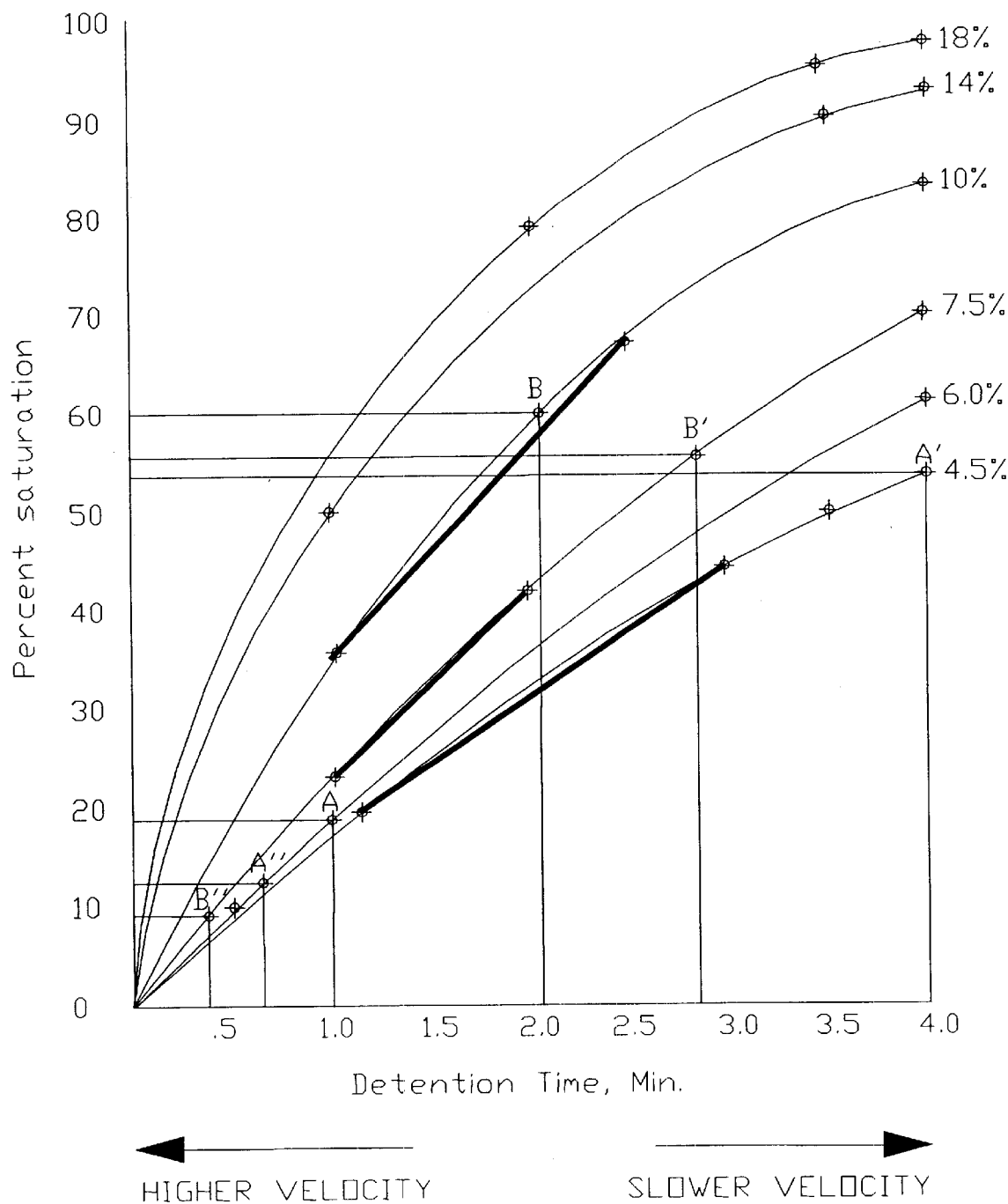
FIG. 7 is a plot of air saturation in water vs detention times for various flows of air bubbles in a baffled pressure vessel. The bold lines are original Hays data (*Sewage and Industrial Waste*, 1956). The single lines are calculated data demonstrating the effect of the invention at detention times of 3 to 4 minutes and at voidages over 10%. Voidages are normalized to 1 atmosphere.

As indicated above, the ported upper plate 102 of control device 100 slows the circulating velocity of the liquor in the upper circulating zone A, thereby significantly increasing the dissolved oxygen/dissolved air content in bioreactor 10[1.] This occurs because the slower circulating velocity increases the air/water contact time at pressure, as demonstrated by Hay's data (FIG. 7). For example, prior art bioreactors typically operate at about 3 ft/second mixed liquor velocity in upflow chamber 24. The corresponding average voidage in that chamber is about 4–5%. The same bioreactor using the present invention would operate at a flow rate of less than 1.5 ft/second and generate an average voidage of about 8–10% in upflow chamber 24. Therefore, it follows that the slower velocity of liquor circulation not only doubles the voidage at any point in upflow chamber 24 but also doubles the detention time of the liquor in upflow chamber 24. As used in this patent application, "detention time" refers to the elapsed time for liquor to flow between two points in upflow chamber 24 (i.e. detention time is synonymous with travel time or residence time in a region of upflow chamber 24).

With reference now to FIG. 7, point A represents the prior art conditions at a selected sample point in upflow chamber 24 (e.g. 180 feet above upper plate 102) at 1 minute detention time and at approximately 4–5% voidage. The air saturation value is about 20%. Point B represents the effect of the present invention on the same bioreactor 10 at the same point in upflow chamber 24 now delayed to 2 minutes detention time and approximately 8–10% voidage (assuming a constant air rate). The air saturation value is about 60%. Thus, by halving the velocity of the circulating liquor the present invention triples the dissolved gas saturation value at a selected sample point in upflow chamber 24 over the prior art in this example.

FIG. 7 also shows the effect of doubling the rate of air injection in a bioreactor 10[1] containing flow control device 100. When the air rate is doubled, the voidage increases 1.7 fold and the velocity increases 1.3 fold (i.e. in an orifice, such as port 108, flow increases proportionally to the square root of the head across the orifice). Point A[1] in FIG. 7 represents a sample point in upflow chamber 24 at about 4% voidage and 4 minutes detention time. Point B[1] represents a point with 70% more voidage and 30% higher velocity (i.e. 30% less detention time). Notwithstanding the increase in liquor circulation velocity, the air saturation value increases slightly (i.e. by about 1%) in this example. Accordingly, when bioreactor 101 is operating at relatively slow liquor circulation velocities, due to the operation of flow control device 100, a marginal increase in velocity does not compromise air saturation values or result in reduced efficiency of aerobic digestion.

By contrast, if a bioreactor is already operating at a high circulation velocity (due to the absence of a flow control device 100) the injection of more air into the system will result in reduced operational efficiency. In FIG. 7 point A[11] represents a sample point in upflow chamber 24 at about 4% voidage and approximately 40 seconds detention time. Point B[11] represents a point with 70% more voidage and 30% higher velocity (i.e. 30% less detention time–roughly 30 seconds). In this case, doubling the rate of air injection reduces the air saturation value by about 2% and consequently compromises the efficiency of aerobic digestion.

As will be apparent to a person skilled in the art, the passage of circulating liquor across the pressure drop created by upper plate 102 results in localized flow velocities of 10–20 ft./second through ports 108 and a pressure drop of 5–15 ft. of water. This enhances mixing and may shear air bubbles thus increasing air/oxygen transfer and enhancing aerobic digestion in upflow chamber 24. The shear velocity and pressure drop is, however, well below the values where damage to the microbes might occur.

Increased Respiration Rate

Figure 8A:
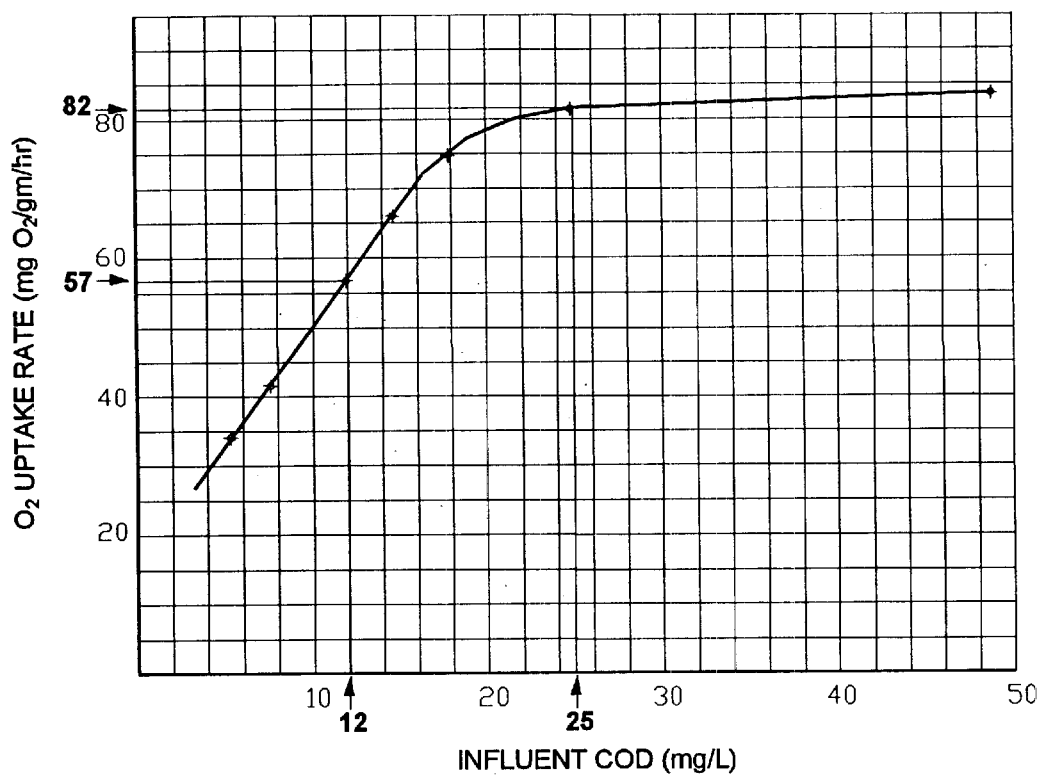
FIG. 8(a) is a Michaelis—Menten method plot of respiration rate (mg $O_2$/gm/hr) vs. wastewater influent strength (COD mg/L).
Figure 8B:
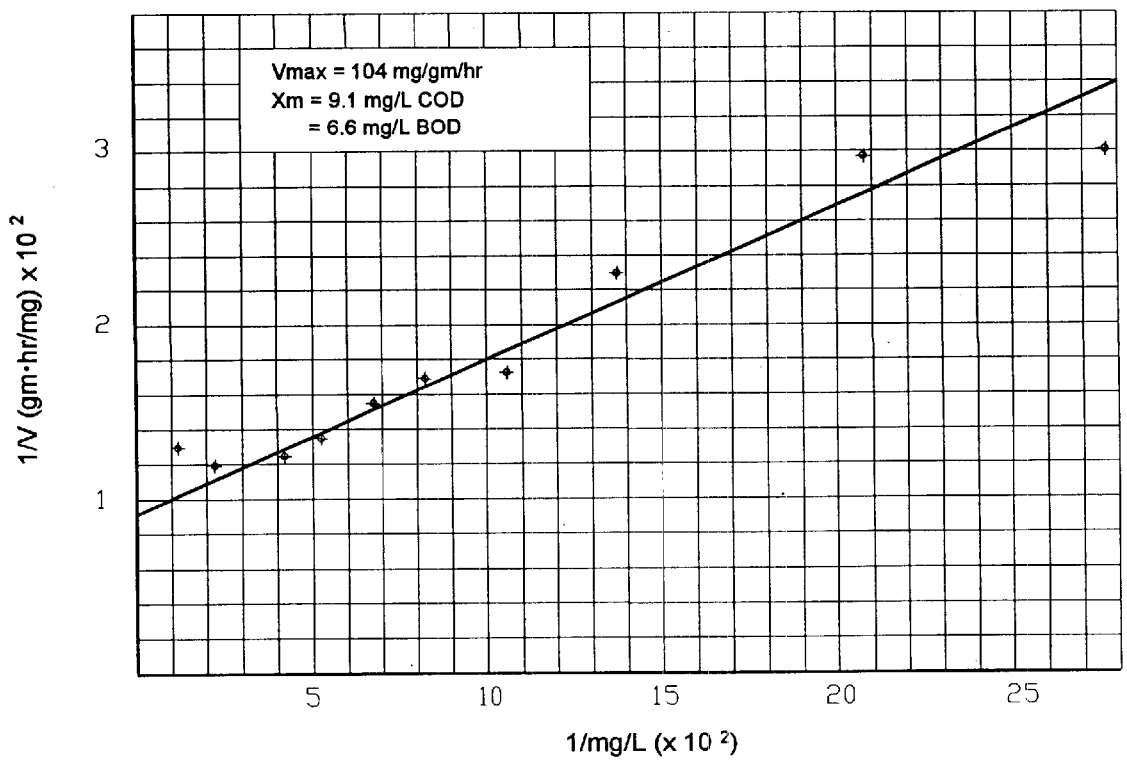
FIG. 8(b) is Lineweaver—Burk method plot of the reciprocal of the respiration rate and wastewater influent strength functions referred to in FIG. 8(a) to determine a maximum respiration rate (velocity $V_{max}$).

Control device 100 allows bioreactor 10[1] to operate at a higher respiration rate for a longer period of time, thus removing more BOD overall. The lower velocity and flow volume at the point of influent injection allows a higher starting concentration of BOD in bioreactor 10[1.] Respiration rate is a measure of biological activity expressed as the amount of $O_2$ consumed (BOD removed) per unit of biomass per unit of time. The units are usually mg of $O_2$ per gram of biomass per hour. BOD is a measure of biologically oxidizeable organic waste in the wastewater or other influent. COD is a measure of chemically oxidizeable organic carbon in the wastewater or other influent. BOD can be estimated from COD. According to Michaelis—Menton and Lineweaver—Burk methods of measuring respiration rate (FIGS. 8(*a*) and (*b*)), a slower circulating velocity reactor will operate at about 1.5 times the respiration rate and for a longer period of time than a higher velocity reactor. For example, the Michaelis—Menton plot (FIG. 8(*a*)) shows rate of reaction on the ordinate and concentration of influent on the abscissa. This is a typical plot showing very little increase in respiration rate above 25 mg/L COD. Alternatively, a Lineweave—Burk plot (FIG. 8(*b*)) can be constructed using the reciprocal of respiration rate and concentration to get an absolute maximum respiration rate at the intersection of the curve on the ordinate (e.g. $V_{max}=1/.96\times 10^{-2}=104$ mg/g/hr).

By way of example, prior art bioreactors 10 operate at above 3 ft./sec. liquor velocity in the upflow chamber 24 and typically contain COD of 12 mg/L after dilution and mixing with the internal recycle. The corresponding respiration rate would be about 57 mg/g/hr. Bioreactor $10^1$ of the present invention, operating at a velocity of 1.5 ft./second in upflow chamber 24, would have half the dilution of the prior art reactor and therefore contain 25 mg/L of COD. The result is an increase of reaction rate from 57 to 82 mg/g/hr or about 44%. This represents a significant gain in bioreactor efficiency.

Further, removing more of the BOD in the circulating zone A of bioreactor $10^1$ by maximizing the respiration rate as discussed above allows the plug flow zone B to operate at a lower or endogenous respiration rate. This is imperative in promoting bioflocculation and improved separation of the biomass in the surface separation basin. By adjusting the liquor flow velocity in circulating zone A, the oxygen uptake rate can be more closely matched to the oxygen supply rate for any given condition. This is very important when operating at thermophilic temperatures where oxygen transfer is much more difficult than when operating at mesophilic temperatures.

Hydraulic head

Control device 100 creates a hydraulic head within bioreactor $10^1$, which allows influent to flow in under gravity through influent line 30 on the low-pressure side (downstream) of device 100 and effluent to exit under pressure through effluent line 34 on the high-pressure (upstream) side of device 100. As described above, upper plate 102 comprises a plurality of spaced-apart ports 108. Preferably some of the ports 108 are non-adjustable, fully open ports to accommodate the majority of the maximum flow and some of the ports 108 are trim ports for accommodating the balance of the flow as required. The size of the trim ports may be controlled from the surface by adjusting moveable trim valves 110.

Accordingly, the pressure drop across upper plate 102 is adjustable to satisfy the functions described above as well as set the desired hydraulic head to eliminate pumping of influent or effluent and all recycle streams. Often flow and load requirements change from original design values and these conditions can be reoptimized by adjusting flow control device 100. The placement of the flow control device 100 in the circulating flow is critical to achieving improved efficiency of bioreactor $10^1$. For example, placement of upper plate 102 anywhere in downflow chamber 26 reduces the head on effluent line 34, resulting in reduced or no flow in that line. Placement of the upper plate 102 in upflow chamber 24 above the point of influent injection will reduce or stop the flow in influent line 30. To maximize the effect of flow control device 100, the placement of upper plate 102 must be in upflow chamber 24 in the vicinity of the lower end 18 of downflow chamber 26 below (i.e. upstream from) the point of influent injection.

Adjusting the hydraulic head within the reactor $10^1$ may be required to control the voidage at the top of upflow chamber 24 to prevent undesirable vibrations due to slugging (which usually occurs at around 15–20% voidage). Flow control device 100 has an inherent ability to allow non-proportionally higher flows as air rates increase but still maintain conditions suitable to maximize oxygen transfer and biological respiration. As discussed above, this is because the flow rate through an orifice increases proportionally to the square root of the head across the orifice. The head across ported upper plate 102 is also a non-linear function of the air rate. These combined features allow flow control device 100 to operate at marginally increased flow rates even with large increases in air injected into the system, thus maintaining the main objectives of the invention described above.

Should port(s) 108 become plugged (which is usually only possible if upper plate 102 comprises a single port 108) the bubbles will tend to back up into the lower end 18 of downflow chamber 26 and cause a circulation reversal thus imposing significant reverse pressure across upper plate 102 to unplug the clogged port 108. Alternatively, an airline can be installed in downflow chamber 26 to allow periodic flow reversal for cleaning.

Control of Inter-zonal Mixing

Figures 2A, 2B:
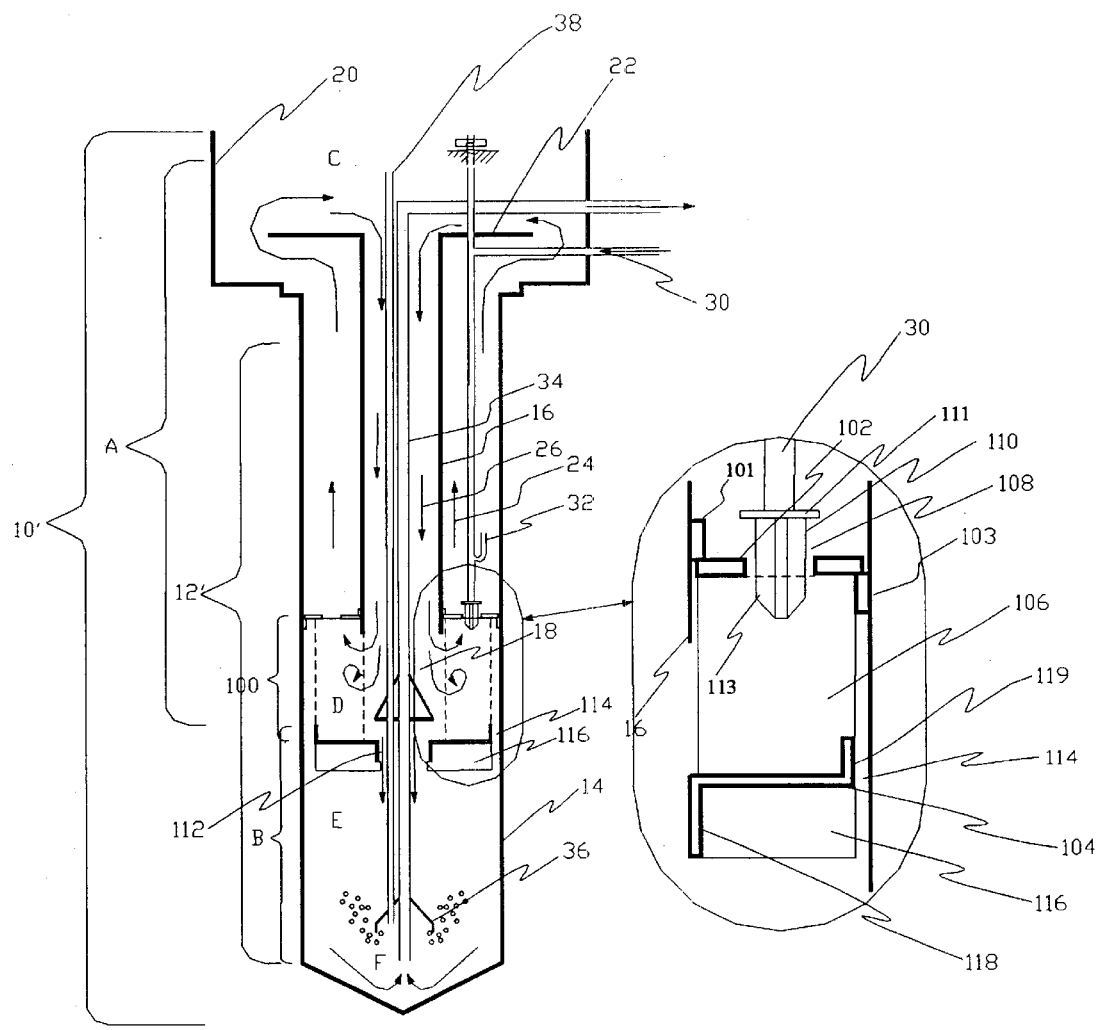

Lower plate 104 of flow control device 100 will allow liquor from mix zone D to enter plug flow zone B while substantially preventing liquor from plug flow zone B from entering mix zone D (FIG. 2). Advanced computer modeling techniques show that as the circulating liquor flows downwardly from the lower end 18 of downflow chamber 26 it traverses impingement plate 120 and is directed outwardly toward outer skirt 119 and reactor wall 14. As a result of this flow path, a small positive pressure develops between outer skirt 119 and reactor wall 14 and a small negative pressure develops between impingement plate 120 and the inner portion of lower plate 104 where inner skirt 118 is located. In the absence of air injection, this pressure differential results in a radial circulation around lower plate 104 as shown in FIG. 9 on the left-hand side of the reactor centerline.

Flow control device 100 is configured to offset the aforesaid radial circulation around lower plate 104 to substantially prevent liquor from entering plug flow zone B. This is thought to be accomplished by one of two mechanisms or possibly a combination of both. The first mechanism is to create an offsetting airlift on the outside of skirt 119. Inner skirt 118, extending downwardly from lower plate 104, is positioned to divert the majority (i.e. about 75%) of the air bubbles rising from aeration distributor 36 through peripheral orifice 114, as shown in FIG. 9 on the right-hand side of the reactor centerline. The resulting airlift head in peripheral orifice 114 thereby offsets the tendency for flow to circulate about plate 104 in a radial direction. Since the airlift head in peripheral orifice 114 can be adjusted to match the downward hydraulic pressure of the fluid in that orifice, the fluid remains in a substantial "stall" condition. In the event that radial circulation is initiated, the bubbles entrained in the flow tend to oppose the forces causing the localized circulation thus restoring the equilibrium. Any downward flow through the peripheral orifice 114 (i.e. liquid flow against the bubble flow) would increase voidage thus increasing airlift to stop flow. Similarly any upward flow through the peripheral orifice 114 (i.e. liquid flow with the bubble flow) would reduce voidage, losing airlift and stopping flow. Radial baffles 116 likewise prevent localized circulation parallel to inner skirt 118.

Figure 9:
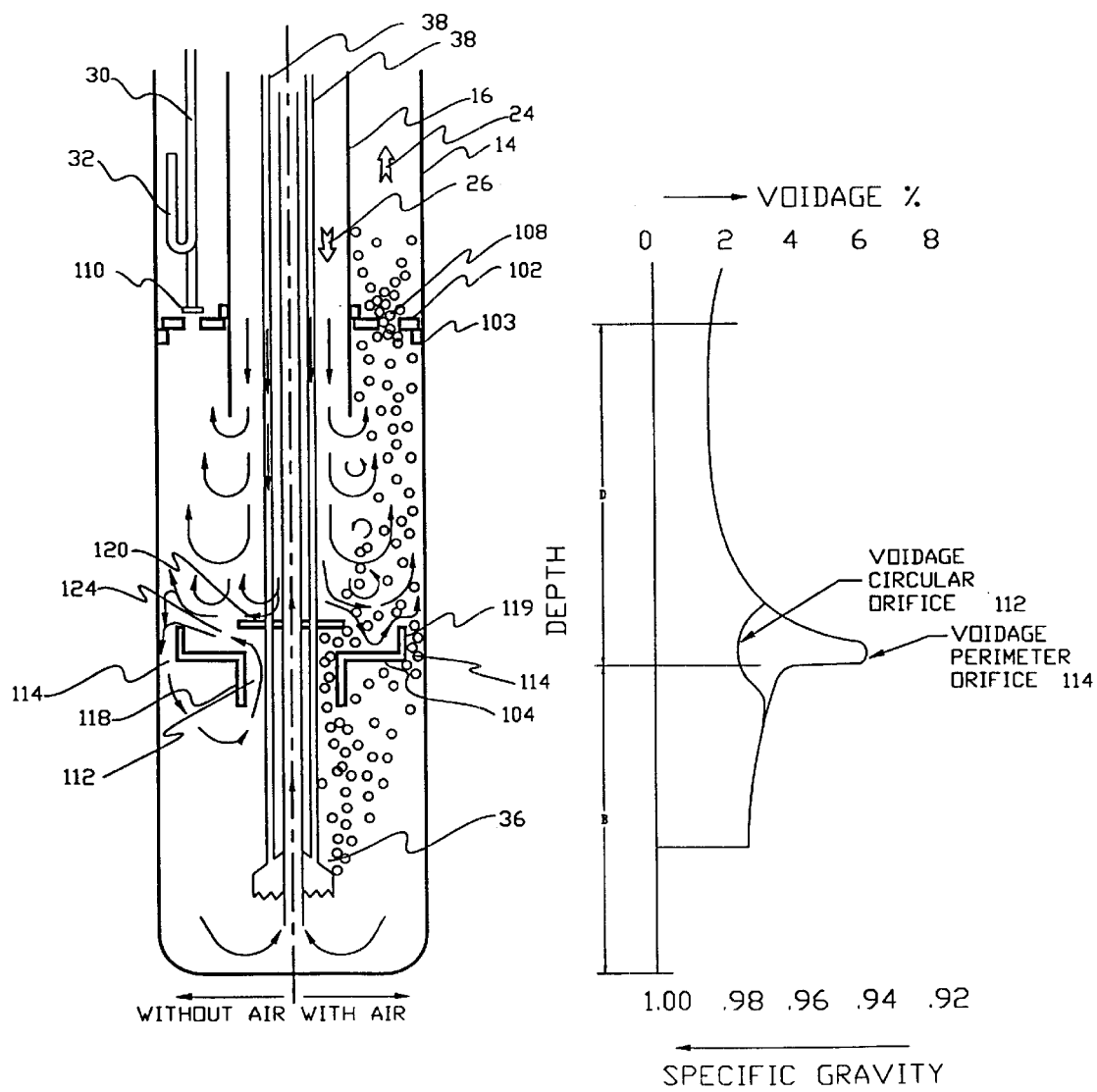
FIG. 9 is a simplified diagram representing the main findings of advanced flow modeling techniques used to design the flow control device. The left of the reactor centerline represents the hydraulic flow regime without air and the right of the centerline shows the hydraulic flow pattern with air. The profile at the right plots specific gravity and voidage vs depth.

The second mechanism for preventing inter-zonal mixing between plug flow zone B and mix zone D and can be seen in FIG. 9 where specific gravity or voidage (i.e. 1−specific gravity) is plotted along the ordinate and depth in bioreactor $10^1$ in the vicinity of flow control device 100 is plotted on the abscissa. It can be seen from this plot that the fluid above plate 104 is significantly less dense than the fluid below it. This difference in density tends to keep the two fluids from mixing in the downward direction.

Accordingly, air bubbles can flow from plug flow zone B to mix zone D but not from the mix zone D to plug flow zone B because localized hydraulic downward circulation between the zones (and bubbles therein) is too slow. In the absence of significant liquid flow downward, the direction of the bubbles is unidirectional upward.

Flow control device 100 thus provides a regulated flow barrier. In particular, lower plate 104 and impingement plate 120, which is mounted independently on effluent line 34, together physically shield plug flow zone B from the majority of downward flow originating from downflow chamber 26 (as indicated above, plug flow zone B does, however, receive a relatively small amount of mix zone liquor in response to effluent flow from bioreactor $10^1$). This allows plug flow zone B to maintain a constant active volume irrespective of the downflow chamber velocity and therefore a constant residence time and saturation potential.

At start-up, before liquor circulation begins, inner skirt 118 divides the upflow of air bubbles from aeration distributor 36 in the ratio of about ¾ toward the outer peripheral orifice 114 and ¼ toward the central orifice 112 as discussed above. The bubbles then preferentially migrate upward into upflow chamber 24. Consequently bioreactor $10^1$ fitted with flow control device 100 will start up in the forward direction without the use of separate start-up air (which is otherwise typically introduced into the reactor via the influent injection line in the prior art).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An aerobic bioreactor having an upper circulating zone and a lower plug flow zone, said bioreactor having elongate upflow and downflow chambers in said circulating zone which are in fluid communication at their upper and lower ends; an influent conduit for discharging biodegradable waste into said upflow chamber; an effluent conduit for extracting effluent from said plug flow zone in a lower portion of said bioreactor; and a gas inlet for injecting oxygen-containing gas into said bioreactor to drive the circulation of a liquor comprising said biodegradable waste between said upflow and downflow chambers wherein said bioreactor comprises a flow control device mounted in said upflow chamber upstream from a discharge end of said influent conduit for adjustably regulating the circulation velocity of said liquor.

2. The bioreactor of claim 1, wherein said flow control device comprises:
    (a) an upper plate mounted in said upflow chamber proximate to the lower end of said downflow chamber, wherein said upper plate comprises a plurality of spaced apertures permitting passage of fluid therethrough; and
    (b) adjustment means for regulating the size of at least some of said apertures.

3. The bioreactor of claim 2, wherein said flow control device imposes a hydraulic head loss near the lower end of said upflow chamber, whereby said circulating liquor on the lower side of said upper plate in communication with said-effluent conduit is maintained at a higher pressure than said circulating liquor on the upper side of said upper plate in communication with said influent conduit, thereby causing said biodegradable waste to flow into said bioreactor through said influent conduit, and said effluent to flow out of said bioreactor through said effluent conduit, without the use of pumps.

4. The bioreactor of claim 1, wherein said circulating liquor changes flow direction from downward flow to upward flow in a turbulent mix zone of said bioreactor located proximate the lower end of said downflow chamber, and wherein said flow control device comprises:
    (c) an upper plate mounted in said upflow chamber near the upper end of said mix zone, said upper plate having a plurality of apertures therein permitting passage of said circulating liquor therethrough; and
    (d) a lower plate mounted in said bioreactor beneath said first plate near the lower end of said mix zone, said lower plate providing a partial barrier to flow of said liquor between said mix zone and a plug flow zone located below said mix zone.

5. The bioreactor of claim 4, wherein said flow control device further comprises adjustment valves for adjustably regulating the size of at least some of said apertures formed in said upper plate.

6. The bioreactor of claim 5, wherein said adjustment valves are remotely controllable.

7. The bioreactor of claim 6, wherein said adjustment valves are operatively coupled to said influent conduit and are moveable therewith.

8. The bioreactor of claim 4, wherein said flow control device comprises a plurality of spaced-apart flow diverting plates extending vertically between said upper and lower plates.

9. The bioreactor of claim 8, wherein said downflow chamber is defined within a downflow conduit extending vertically in a central portion of said bioreactor; said upflow chamber is defined between said downflow conduit an inner wall of said bioreactor; and said effluent conduit extends vertically in a central portion of said bioreactor through said downflow conduit, wherein said flow control device further comprises an impingement plate mounted on said effluent conduit in said mix zone above said lower plate for diverting downwardly flowing liquor toward said lower plate.

10. The bioreactor of claim 9, wherein the position of said impingement plate is remotely adjustable to vary the size of said central orifice.

11. The bioreactor of claim 9, wherein said flow control device further comprises a inner skirt extending downwardly from an inner portion of said lower plate and defining a central orifice between said inner skirt and said effluent conduit; and an outer skirt extending upwardly from an outer portion of said lower plate and defining a peripheral orifice between said outer skirt and said inner wall of said bioreactor.

12. The bioreactor of claim 11, wherein said gas inlet is located in said plug flow zone below said flow control device, and wherein gas bubbles rise from said plug flow zone through said central and peripheral orifices.

13. The bioreactor of claim 12, wherein said central and peripheral orifices are approximately the same size.

14. The bioreactor of claim 12, wherein said flow control device further comprises a plurality of spaced radial baffles extending downwardly from said lower plate slightly lower than the depth of said inner skirt and intersecting said inner skirt at right angles.

15. The bioreactor of claim 12, wherein said inner skirt diverts the majority of said gas bubbles toward said peripheral orifice.

16. In a long vertical shaft aerobic bioreactor having an upper circulating zone and a lower plug flow zone, said bioreactor having elongate upflow and downflow chambers which are in fluid communication at their upper and lower ends; an influent conduit for discharging biodegradable waste into said upflow chamber; an effluent conduit for extracting effluent from said plug flow zone in a lower portion of said bioreactor; and a gas inlet for injecting oxygen-containing gas into said bioreactor to drive the circulation of a liquor comprising said biodegradable waste between said upflow and downflow chambers, the improvement comprising:

a flow control device mounted in said upflow chamber upstream from a discharge end of said influent conduit, wherein said flow control device adjustably regulates the circulation velocity of said liquor.

17. A method of improving the efficiency of long vertical shaft aerobic bioreactors having an upper circulating zone and a lower plug flow zone, said bioreactor having elongate upflow and downflow chambers which are in fluid communication at their upper and lower ends; an influent conduit for discharging biodegradable waste into said upflow chamber; an effluent conduit for extracting effluent from said plug flow zone in a lower portion of said bioreactor; and a gas inlet for injecting oxygen-containing gas into said bioreactor to drive the circulation of a liquor comprising said biodegradable waste between said upflow and downflow chambers, said method comprising the steps of:

(a) adjusting the volume of said oxygen-containing gas injected into said bioreactor in response to changes in the volume and/or concentration of biodegradable waste discharged into said bioreactor, thereby optimizing the rate of aerobic digestion of said waste; and (b) reducing the circulation velocity of said liquor to increase the residence time of said liquor in said upflow chamber.

18. The method of claim 17, further comprising imposing a hydraulic head loss at a lower end of said upflow chamber thereby causing said biodegradable waste to flow into said bioreactor through said influent conduit and flow out of said bioreactor through said effluent conduit without the use of pumps.

19. The method of claim 17, wherein said circulation velocity is reduced by partially obstructing the flow of said liquor at a location in said upflow chamber upstream from the location where said biodegradable waste is discharged into said upflow chamber.

20. The method of claim 19, further comprising partially obstructing downward flow of liquor in said bioreactor at a location between a lower end of said downflow chamber and the location where said oxygen-containing gas is injected into said bioreactor.

21. The bioreactor of claim 1, further comprising a mixing zone in a lower portion of said circulating zone proximate and said lower ends of said upflow and downflow chambers, wherein said flow control device regulates the depth of penetration of said liquor from said mixing zone into said plug flow zone.

22. An aerobic bioreactor comprising elongate upflow and downflow chambers which are in fluid communication at their upper and lower ends; an influent conduit for discharging biodegradable waste into said upflow chamber; an effluent conduit for extracting effluent from a lower portion of said bioreactor; and a gas inlet for injecting oxygen-containing gas into said bioreactor to drive the circulation of a liquor comprising said biodegradable waste between said upflow and downflow chambers, wherein said liquor flows upwardly in said upflow chamber and downwardly in said downflow chamber, said bioreactor further comprising a flow control device mounted in said upflow chamber below a discharge end of said influent conduit for adjustably regulating the circulation velocity of said liquor.

23. The bioreactor of claim 22, wherein said flow control device is located in a lower portion of said upflow chamber.

24. The bioreactor of claim 22 said upflow and downflow chambers are located in an upper circulating zone of said bioreactor and wherein said effluent is extracted from a lower plug flow zone of said bioreactor below said circulating zone.

25. The bioreactor of claim 24, wherein said gas inlet is located in said plug flow zone.

26. A method of regulating the flow of a liquor comprising biodegradable waste in a long vertical shaft aerobic bioreactor, said bioreactor having elongate upflow and downflow chambers which are in fluid communication at their upper and lower ends, said liquor flowing upwardly in said upflow chamber and downwardly in said downflow chamber, said method comprising:

(a) positioning a flow control device in said upflow chamber proximate a lower end thereof, wherein said flow control device regulates the velocity of said liquor in said upflow chamber; and (b) introducing influent into said upflow chamber at a location above said flow control device.

27. The method as defined in claim 26, wherein said upflow and downflow chambers are located in an upper circulating zone of said bioreactor, said method further comprising extracting effluent from a plug flow zone of said bioreactor located below said circulating zone.

28. The method as defined in claim 27, further comprising introducing oxygen-containing gas into said plug flow zone to drive flows of said liquor in said circulating zone.

29. The method as defined in claim 27, wherein said bioreactor further comprises a mixing zone in a lower portion of said circulating zone proximate said lower ends of said upflow and downflow chambers, said method further comprising adjusting said flow control device to regulate the depth of penetration of said liquor from said mixing zone into said plug flow zone.

* * * * *